US008422186B2

(12) United States Patent
Penniston

(10) Patent No.: US 8,422,186 B2
(45) Date of Patent: Apr. 16, 2013

(54) LOW LEVEL VOLTAGE PROGRAMMABLE LOGIC CONTROL

(76) Inventor: William K. Penniston, Gananoque (CA)

( * ) Notice: Subject to any disclaimer, the term of this patent is extended or adjusted under 35 U.S.C. 154(b) by 1298 days.

(21) Appl. No.: 11/682,568

(22) Filed: Mar. 6, 2007

(65) Prior Publication Data

US 2008/0218924 A1  Sep. 11, 2008

(51) Int. Cl.
*H02H 5/04* (2006.01)

(52) U.S. Cl.
USPC ............................. 361/93.8; 361/96; 361/106

(58) Field of Classification Search .................. 361/93.2
See application file for complete search history.

(56) References Cited

U.S. PATENT DOCUMENTS

| | | | | |
|---|---|---|---|---|
| 3,229,242 A | * | 1/1966 | Finney et al. .................. | 439/679 |
| 4,425,495 A | * | 1/1984 | Cake et al. ..................... | 219/267 |
| 4,733,323 A | * | 3/1988 | Yang .............................. | 361/105 |
| 4,866,557 A | * | 9/1989 | Fitts et al. ....................... | 361/96 |
| 4,949,362 A | * | 8/1990 | Gaubatz ........................ | 376/259 |
| 5,073,034 A | * | 12/1991 | Beran et al. .................... | 374/183 |
| 6,319,740 B1 | * | 11/2001 | Heffner et al. ................. | 438/26 |
| 6,707,651 B2 | | 3/2004 | Elms et al. | |
| 7,154,494 B2 | * | 12/2006 | Kato et al. ..................... | 345/212 |
| 2004/0227437 A1 | * | 11/2004 | Newton et al. ................ | 312/287 |

* cited by examiner

*Primary Examiner* — Jared Fureman
*Assistant Examiner* — Nicholas Ieva

(57) ABSTRACT

An improved programmable logic control device for monitoring the current of a circuit and for signalling a circuit control device, the programmable logic control device including electrical power circuitry for activating the circuit control device and electrical circuitry for monitoring the current in the electrical circuit, the electrical circuitry including: adjustable electrical signal input circuitry to monitor the electrical current in the circuit; adjustable pick-up circuitry for adjusting the level of the current monitored in the electrical circuit, the pick-up circuitry having a thermister means for improved stabilization; adjustable time circuitry to command the electrical power circuitry to activate the circuit control device when the electrical current in the electrical circuit reaches the selected level and time duration, the time circuitry having an increased time duration to minimize nuisance tripping; and a zener diode in reverse mode for controlling the level of voltage applied to the adjustable pick-up circuitry and time circuitry substantially without resistive burden, the zener diode in reverse mode passing a reference voltage which is less than an input voltage to the said device. The device is preferably packaged in material that is resistant to radiation, such as ceramic, and is well-suited for harsh environment applications.

18 Claims, 11 Drawing Sheets

US 8,422,186 B2

LOW LEVEL VOLTAGE PROGRAMMABLE LOGIC CONTROL

FIELD OF THE INVENTION

This invention relates to a universal low level voltage programmable logic control for protecting electrical power systems against damage caused by overloads and faults, and particularly relates to improvements to a programmable logic control that activates a circuit breaker or trip device.

BACKGROUND OF THE INVENTION

Universal programmable logic control device have been developed to serve as circuit breakers in order to protect electrical circuit and devices from damage due to circuit overloads and ground faults and are generally part of safety related equipment. In the event of a fault, the circuit is broken for safety reasons.

For example, U.S. Pat. No. 4,866,557 to Fitts et al. ("'557") discloses a low level voltage programmable logic control device for monitoring the current of a circuit and for signalling a control device, the programmable logic control device including electrical power circuitry for activating the control device and electrical circuitry for monitoring the current, the electrical circuitry including: adjustable electrical signal input circuitry (in the form of ampere taps) to match the programmable logic control device to the electrical current in said circuit, adjustable pick-up circuitry for adjusting the level of the current monitored in the electrical circuit, and adjustable time circuitry for adjusting the time duration of the selected level of electrical current, so as to command the electrical power circuitry to activate the control device when the electrical current in the electrical circuit reaches the selected level and time duration and means for controlling the level of voltage applied to the adjustable pick-up circuitry and time circuitry substantially without resistive burden, said means passing a reference voltage which is less than an input voltage to said means.

The '557 programmable logic control device is described as universal in the sense that one device can be used to effectively monitor electrical systems over a range of electrical characteristics by selecting the appropriate ampere tap and control knobs which are incorporated in the device rather than utilizing a number of current transformers or logic devices. In the preferred embodiment disclosed therein, the programmable logic control device may be universally utilized to monitor currents between a range of 30 to 4400 amps.

Other arrangements are shown in U.S. Pat. Nos. 6,707,651 B2, 4,949,362, 4,733,323 and 4,866,557. In some circumstances these circuit breakers have experienced spurious tripping that can be due to a number of factors such as short-duration, high amplitude current transients causing unwanted tripping of some circuit breakers. These high amplitude current transients can include high frequency electrical noise spikes from lightning storms or the like.

Generally speaking spurious tripping of circuit breakers is undesirable due to unnecessary power loss and erratic safety functions of the circuits. Spurious tripping concerns have been particularly documented in the nuclear industry as evidenced by the Sep. 17, 1993 NRC Information Notice 93-75 entitled "Spurious Tripping of Low-Voltage Power Circuit Breakers with GE RMS-9 Digital Trip Units" (U.S. Nuclear Regulatory Commission, Office of Nuclear Reactor Regulation, Washington, D.C., especially when these devices are implemented in nuclear reactors.

Nuisance or spurious tripping should be understood as any event where a power circuit breaker undergoes a false trip indication due to a transient. This can occur when, for example, there is a ground current surge during a lightening strike. Further, any electric circuit operating in harsh environment applications routinely face temperature fluctuations, and these fluctuations can often be severe. Moreover, in the nuclear reactor context, circuits may be exposed to radiation which can erode the integrity of the circuit components and jeopardize their performance.

In light of the foregoing, what is needed is a programmable logic control which is more stabile to temperature variations. What is further needed is a programmable logic control which is more resilient to transient spikes. What is yet further needed is a programmable logic control which is less susceptible to radiation.

SUMMARY OF THE INVENTION

The present invention relates to an improved programmable logic control device for monitoring the current of a circuit and for activating a control device if the current exceeds a selected level for a selected interval. In one aspect, the present invention provides a thermister means for stabilizing the circuitry of the programmable logic control device such that the device is less susceptible to temperature fluctuations, which may often result in nuisance tripping. In one particular embodiment, the thermister means comprises two thermisters separated by a resistor. In another aspect, the present invention provides a programmable logic control device having an improved time constant for the purposes of riding out spurious voltage spikes, further reducing the likelihood of nuisance tripping. In yet another aspect, the present invention provides a programmable logic control device comprising components housed in a material resistant to radiation. In one particular embodiment, the material is ceramic. A programmable logic control device in accordance with the present invention provides is well-suited for harsh environment applications, and especially for use in nuclear reactor environments.

BRIEF DESCRIPTION OF THE DRAWINGS

A detailed description of the preferred embodiments is provided herein below by way of example only and with reference to the following drawings, in which.

Figure 1:
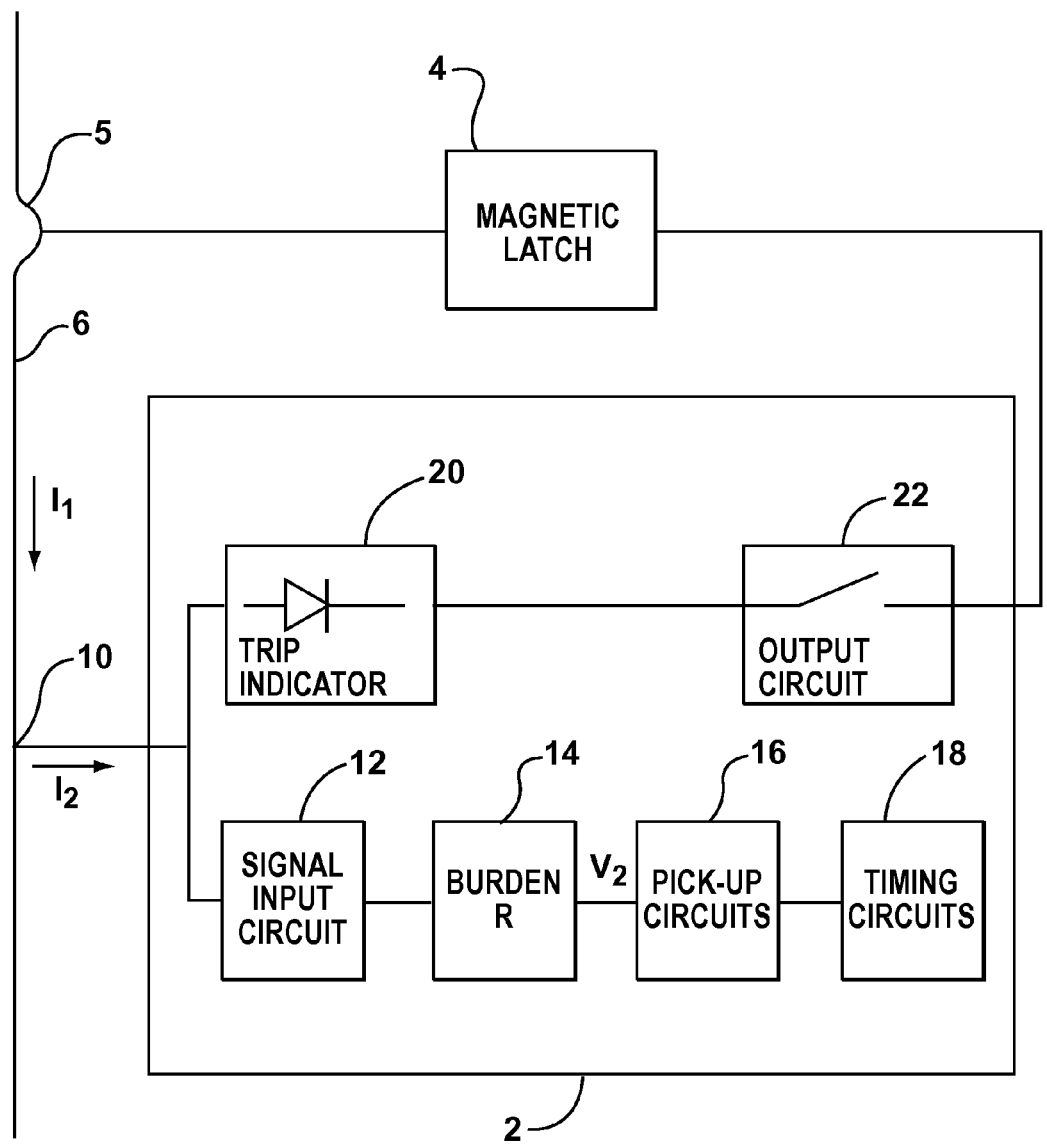
FIG. 1 is a basic diagram of the programmable logic control device.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

FIG. 1 illustrates generally the programmable logic control device 2 which controls or commands a control device such as the trip device 4 which is a magnetic latch which trips the circuit breaker 5 in the case of abnormal conditions in the electrical conductor 6 of an electrical power system (not shown). The programmable logic control device 2 is connected to an electrical sensing device mounted on the conductor 6, namely, a sensor 10. Sensor 10 is connected to the programmable logic control device 2 by suitable electrical wiring.

The programmable logic control device 2 includes a signal input circuit 12, a burden resister 14, pick-up circuits 16 and timing circuits 18 generally depicted in FIG. 1 and more fully particularized in FIG. 2 to FIG. 11, inclusive.

The sensor 10 supplies the programmable logic control device 2 with a signal $I_2$ which is proportional to the primary current $I_1$ in the electrical conductor 6. The sensor 10 also provides the bias-power required to operate the circuit trip device 4 and the circuitry of the programmable logic control device 2. The sensor 10 is switched to the trip device 4 to open the circuit breaker 5 when the primary current $I_1$ exceeds the selected magnitude and time-delays as more fully particularized herein. The trip device or magnetic latch 4 is powered by the line current through the sensor 10 and the programmable logic control device. It has been found that by separating the power box from the control board harmonics are substantially reduced or filtered out.

The secondary current $I_2$ is rectified in the programmable logic control device 2 and is burdened with a resistor 14 which is selected by selection of suitable ampere-tap. The ampere-taps available for the programmable logic control device 2 do not depend on the frame size of the circuit breaker. The ampere taps utilized in the programmable logic control device 2 for the transformer current ratings can be utilized to modify the current rating by a ratio of 0.5, 0.75 or 1.0. In other words if we are monitoring a 3000 amp conductor 6 we would utilize a 4000 amp current transformer and select the appropriate ampere tap of RB1, RB2, RB3 illustrated in FIG. 2 at 0.75 in order to monitor a primary current of 3000 amps through conductor 6. Similarly, a 300 amp primary current $I_1$ could be monitored by utilizing a 600 amp current transformer and an ampere tap multiple of 0.5.

By utilizing different ampere-taps, as described herein, the programmable logic control device 2 is capable of monitoring and controlling circuits having a wide range of current characteristics which may be easily and quickly changed so as to accommodate a great variety of current ranges.

Figure 2:
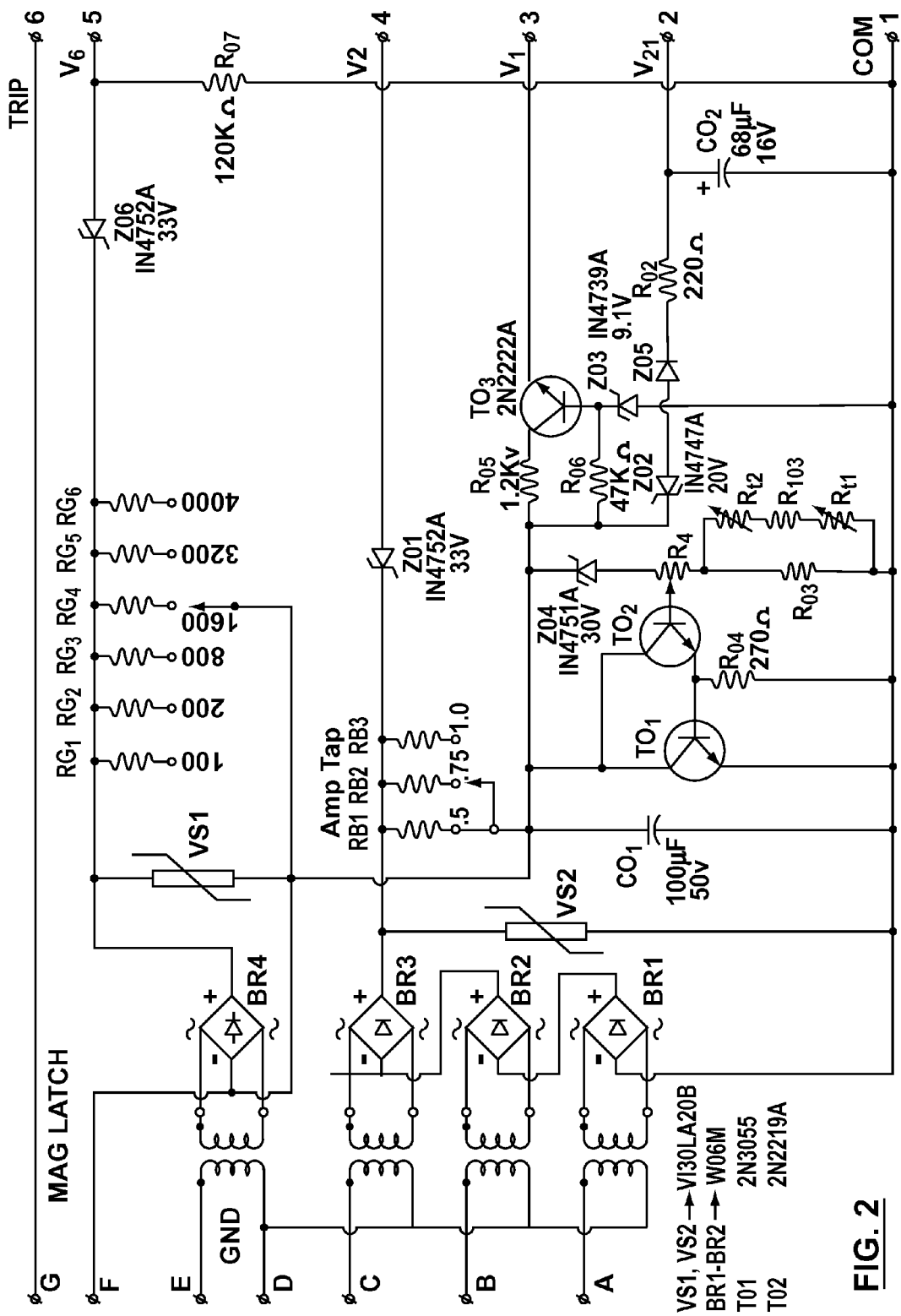
FIG. 2 is a detailed electrical circuit drawing of the power supply and monitoring circuitry.
Figure 3:
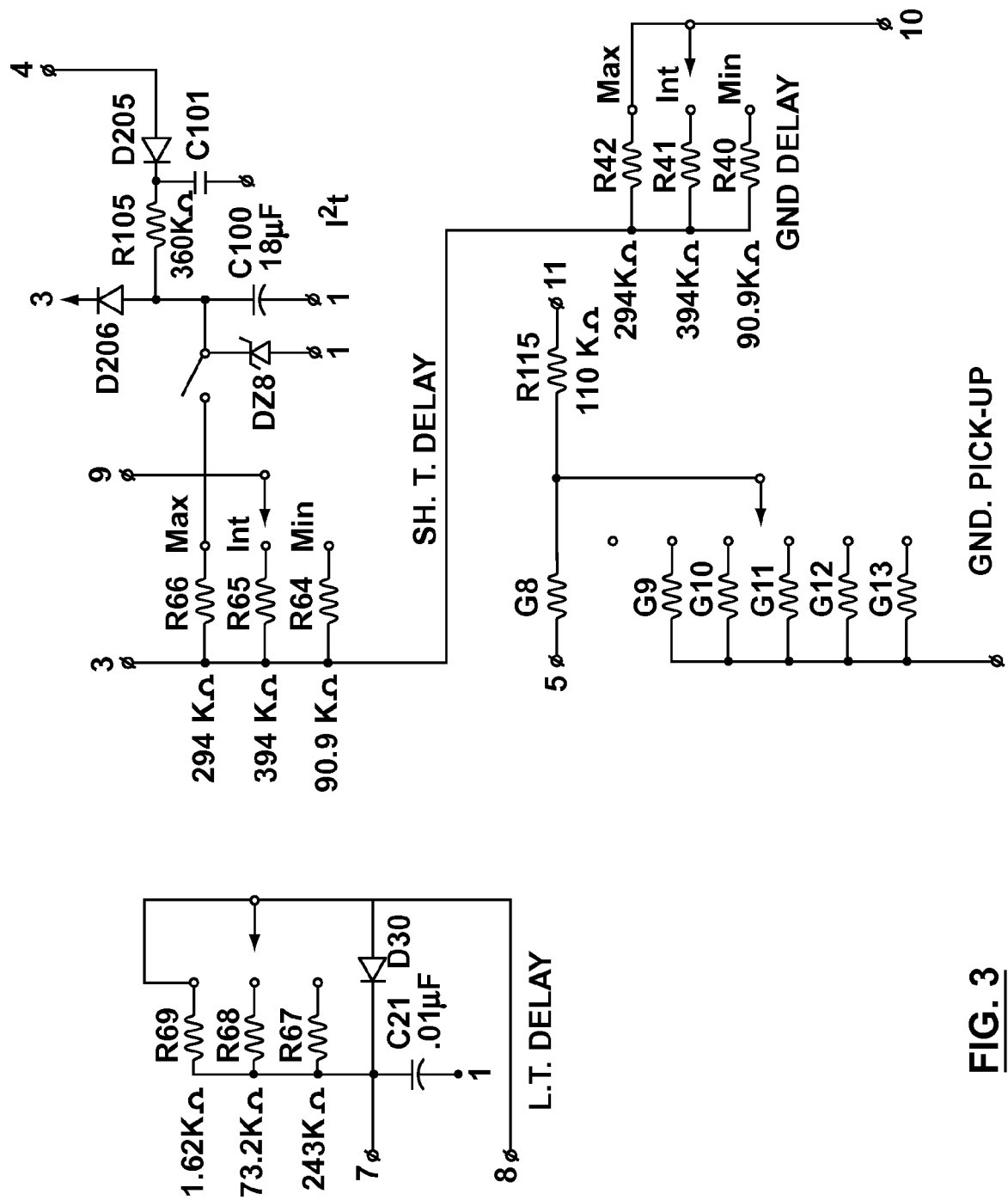
FIG. 3 is a detailed electrical circuitry of the long time delay short time delay, ground pick-up and ground delay circuitry of the programmable local control device.
Figure 4:
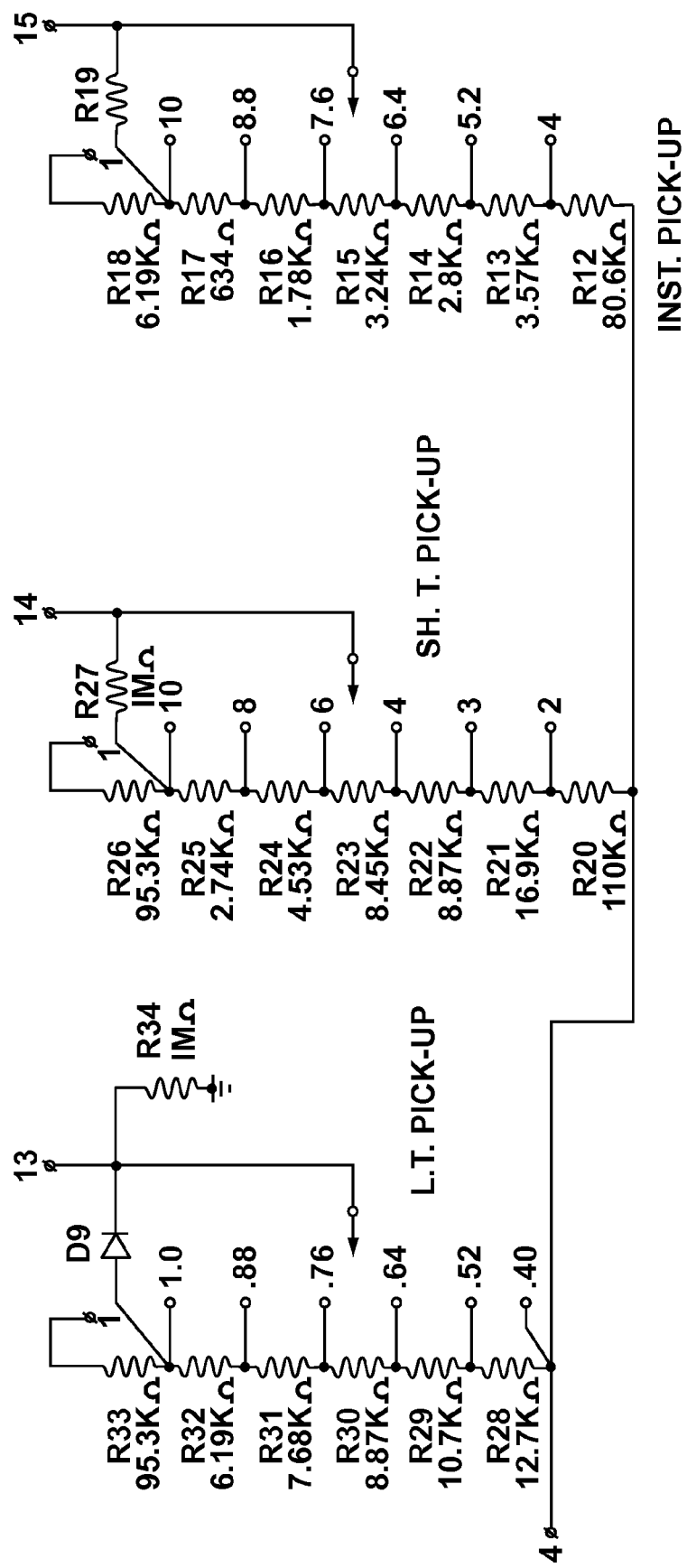
FIG. 4 is a detailed drawing of the long time pick-up, short time pick-up, and instantaneous pick-up circuitry of the programmable logic trip device.
Figure 5:
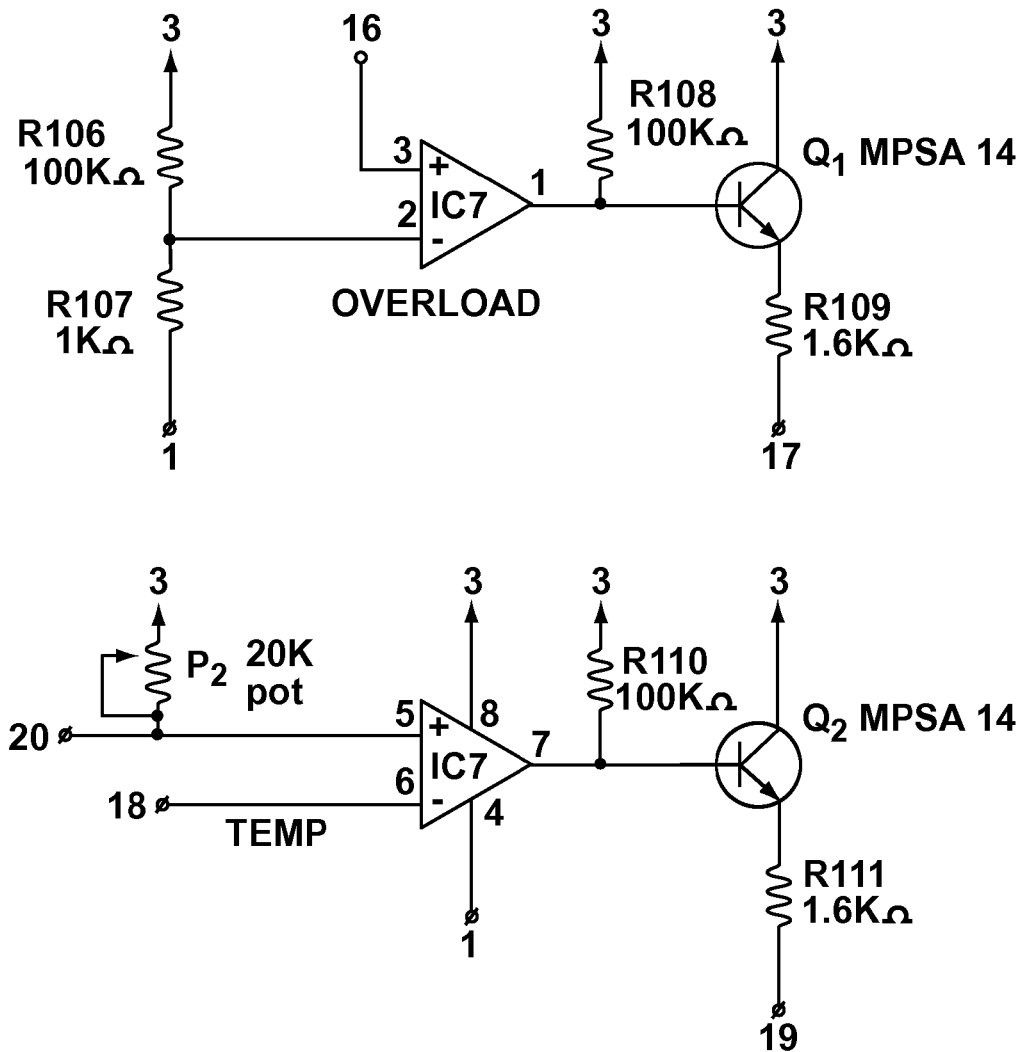
FIG. 5 is a detailed electrical circuit drawing for the light emitting diode.
Figure 6:
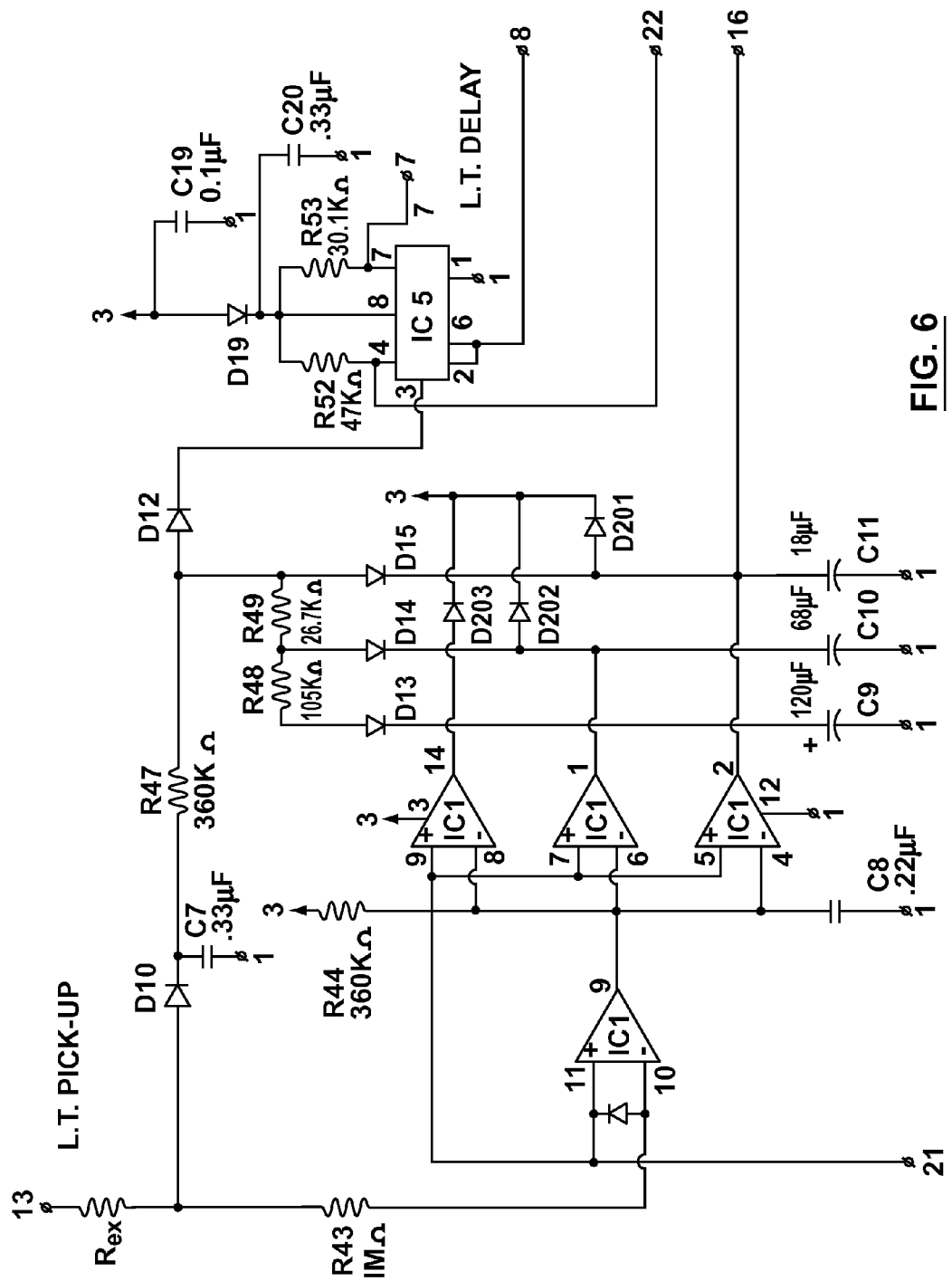
FIG. 6 is a detailed electrical circuit drawing of the long time pick-up circuitry of the programmable logic control device.
Figure 7:
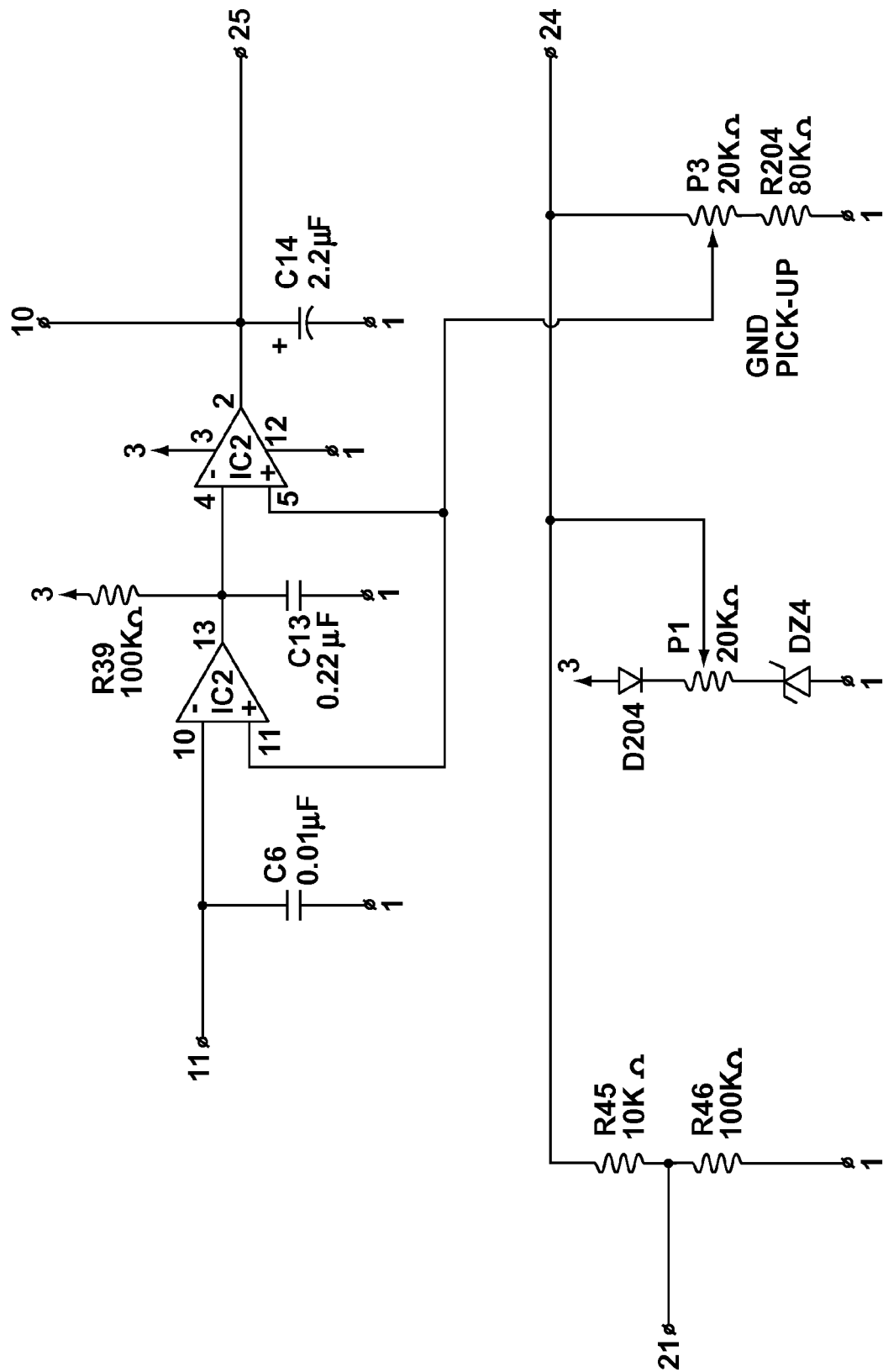
FIG. 7 is a detailed electrical circuit drawing of the reference voltage ground and long time pick-up.

Once the appropriate ampere-taps have been selected as described herein, a voltage $V_2$ is developed across the burden resistor 14 which voltage is proportional to both the primary current $I_1$ and secondary current $I_2$, according to the "power board" circuitry as illustrated in FIG. 2. The electrical pick up circuits are activated by $V_2$ if it exceeds a particular selected level. The electronic pick-up circuits 16 consist of Long Time Pick-up, Short Time Pick-up, Instantaneous Pick-up, and Ground Pick-up. If any of the electronic pick-up circuits 16 are activated then the time delay circuits 18 are activated to determine that $V_2$ and therefore $I_1$ have persisted for a predetermined and selected time interval. At the expiration of the delayed time, the output circuit 22 is triggered so as to enable the power supply from sensor 10 to activate the magnetic latch 4 and thereby opening the circuit breaker 5.

As best illustrated in FIG. 2, Zener diodes Z01, Z02, Z04 and Z06 are used in reverse mode so as to drop the voltage substantially without resistive burden. FIG. 2 shows that Zener diode Z01 has a rating of 33 volts. If Zener diode Z01 was used in the normal mode once the current applied to the anode side reached 33 volts, Zener diode Z01 would open or gate to let all of the voltage through. In the invention disclosed herein Zener diode Z01 is utilized in the reverse mode so that when the input voltage applied to the cathode side of the Zener diode Z01 reached the rating of 33 volts, Zener diode Z01 will allow only the excess through. For example, if an input voltage of 100 volts is applied to the cathode side of Zener diode Z01, a reference voltage of 67 volts passes through. Therefore the use of Zener diode Z01 in the reverse mode substantially eliminates wave distortions on the line.

Zener diode Z01 is used for giving a voltage drop of 33 volts for the phase voltage without substantially adding any resistive burden.

Zener diode Z02 is used for giving voltage drop of 20 volts without substantially adding any resistive burden for powering the static indicators.

Zener diode Z04 is used for giving a voltage drop of 30 volts without substantially adding any resistive burden and thus providing an adjustment of the phase voltage.

Zener diode Z06 is used for providing a voltage drop of 33 volts for the ground voltage without substantially adding any resistive burden.

The programmable logic control device 2 features instantaneous pick-up, short time pick-up, long time pick-up and ground pick-up, as particularized in U.S. Pat. No. 4,866,557, which is incorporated herein by reference.

According to one particular aspect of the present invention, the "power board" portion of the circuitry of the programmable logic control device 2 comprises a shunt placed around $R_{03}$ comprising two thermisters, $R_{t1}$ and $R_{t2}$, separated by a resister $R_{103}$, as illustrated in FIG. 2. The addition of these devices is advantageous for the operation of the programmable logic control device 2 because it acts to stabilize the system, especially with respect to temperature variations.

A characteristic of any silicon junction transistor is that its function will vary according to the temperature of its environment. Consequently, temperature fluctuations are known to cause unwanted problematic variation in $V_2$, the voltage monitored by the pick-up circuitry, because of the temperature effects on $TO_1$ and $TO_2$. In particular, an increase in voltage in $V_2$ is seen with decreasing temperature. This phenomenon is particularly relevant for circuits deployed in harsh environments, which often see severe temperature swings in the course of operation.

The resistance across the shunt comprising thermisters $R_{t1}$ and $R_{t2}$ and separated by a resister $R_{103}$ also varies with temperature, but the variance is inverse to the temperature change, i.e. the resistance decreases with an increase in temperature. As a result, burden voltage $V_2$ remains more consistent in the event of temperature swings.

Having this advantageous configuration results in much less change to $V_2$ during temperature fluctuations. For example, a programmable logic control device not including the two thermisters, $R_{t1}$ and $R_{t2}$, separated by a resister $R_{103}$, may exhibit a voltage rise in $V_2$ of approximately 15% if there is a temperature decrease of 35 degrees Celsius. However, the same decrease in temperature would only result in a voltage drop of 5% for $V_2$ in programmable logic control device 2.

Figure 8:
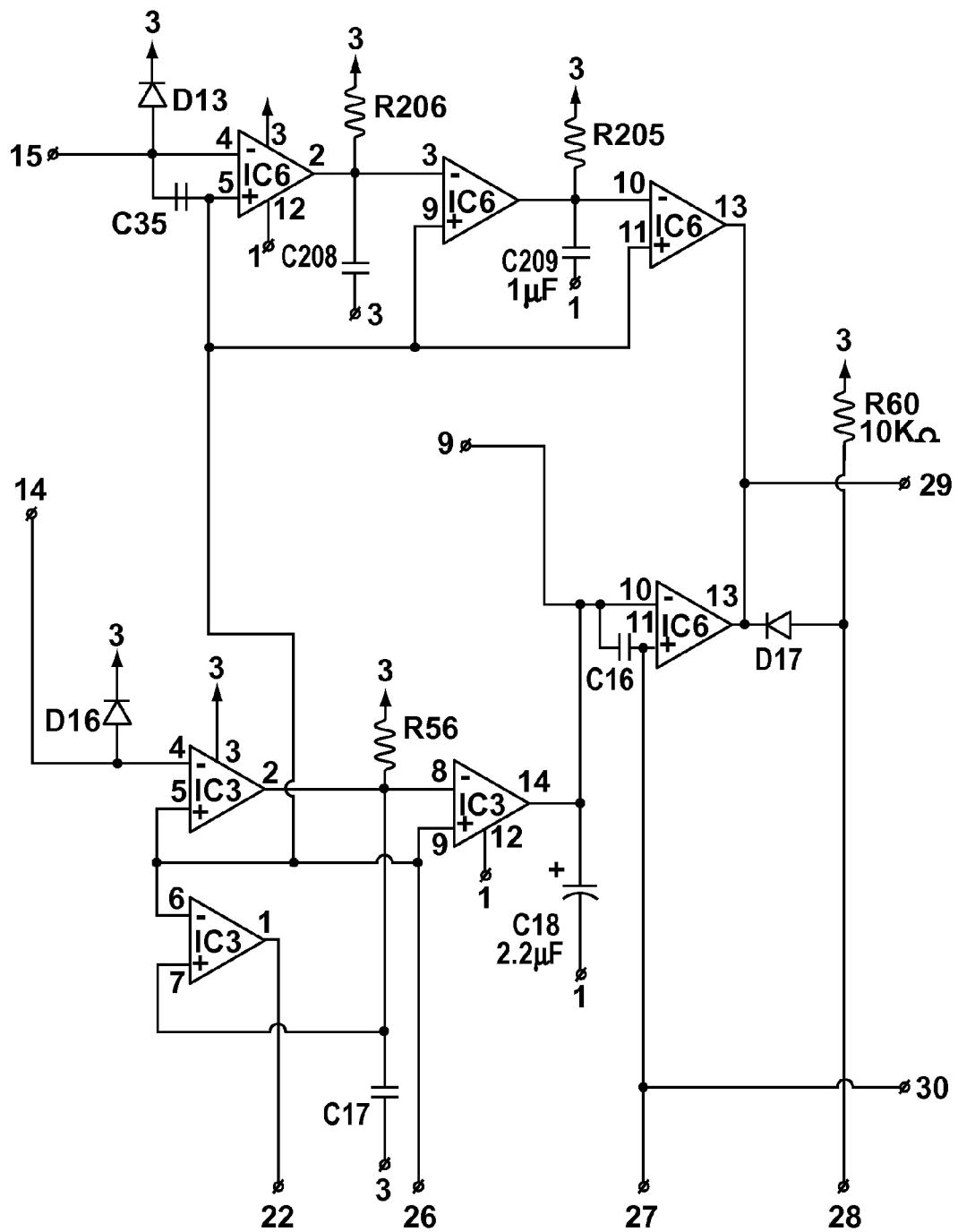
FIG. 8 illustrates comparator circuits for instantaneous and short time for reference voltage.
Figure 9:
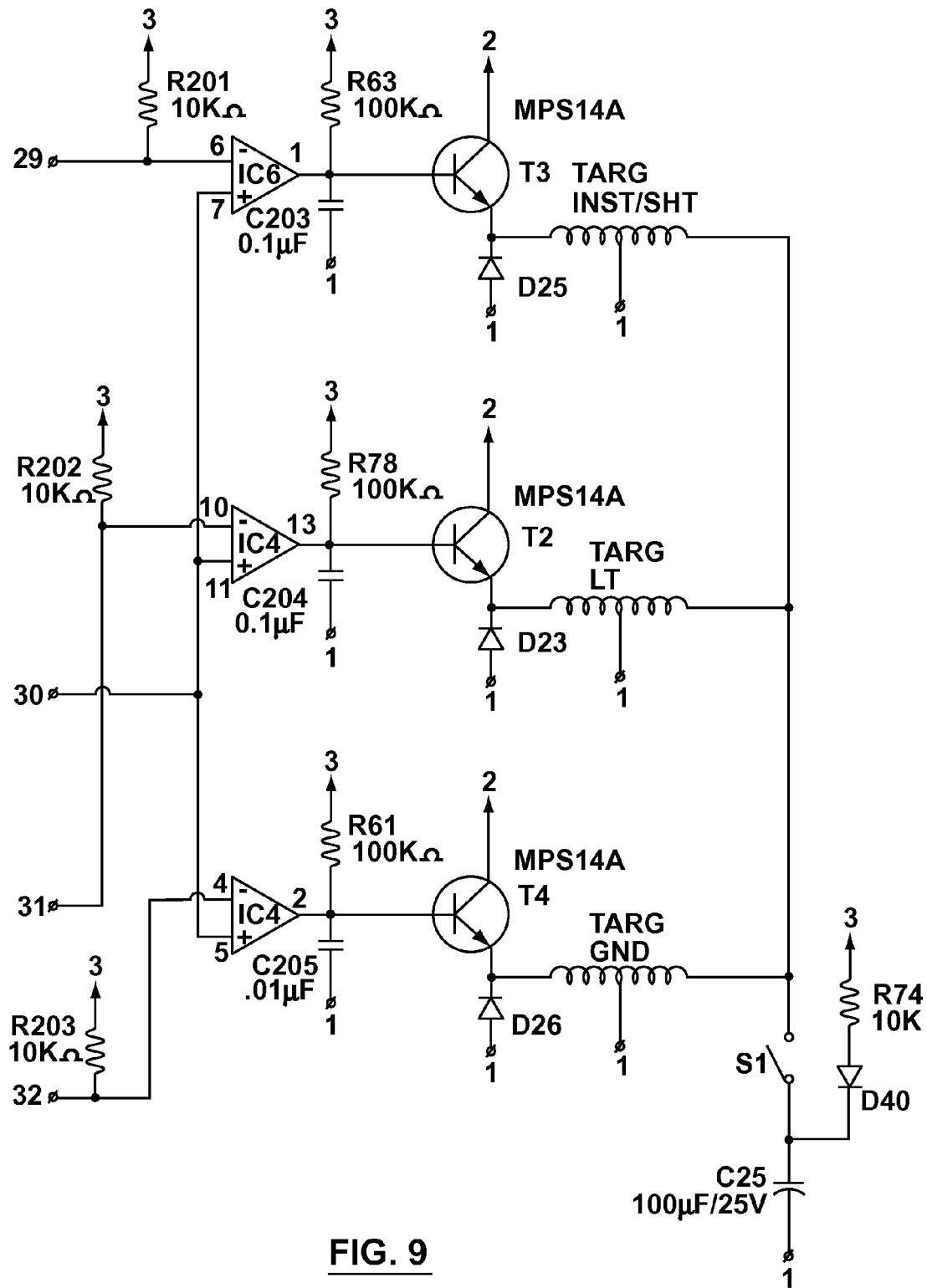
FIG. 9 illustrates the target circuitry.
Figure 10:
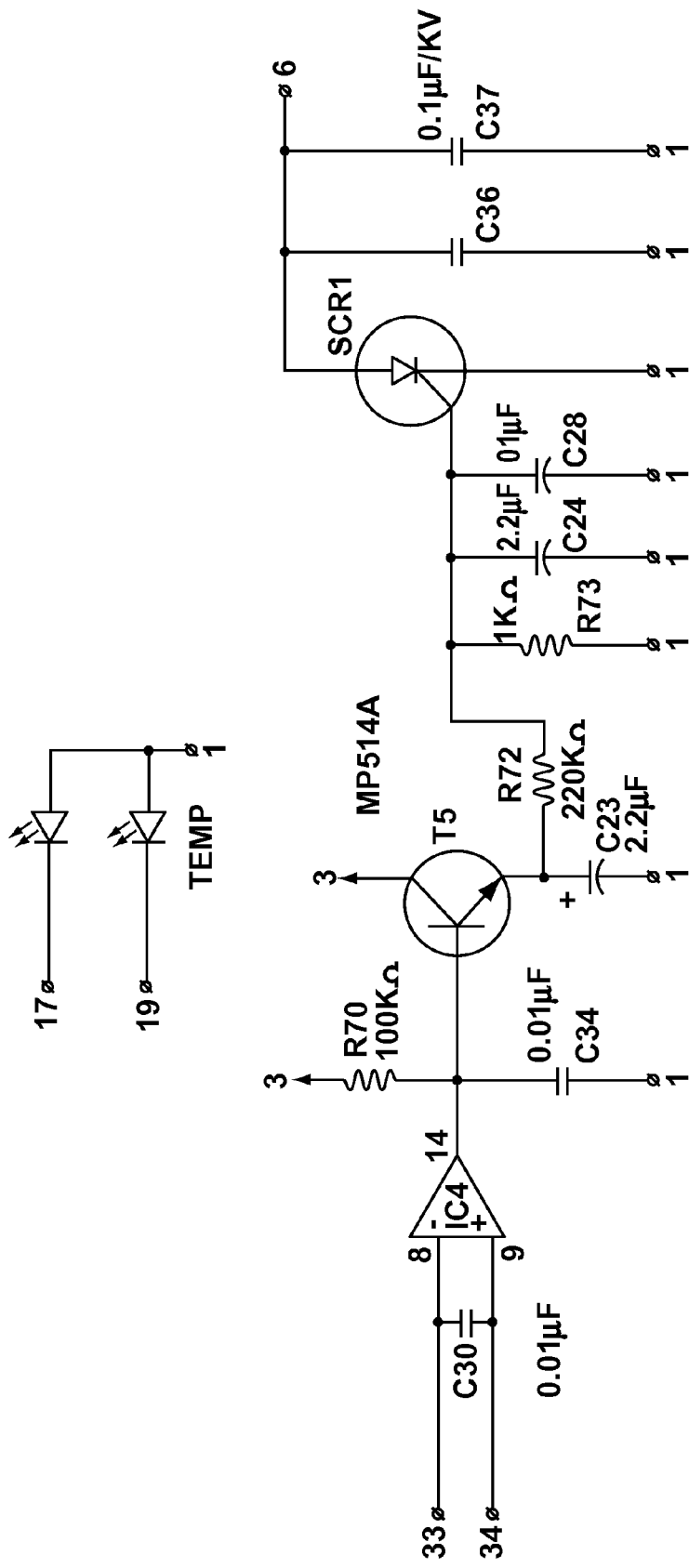
FIG. 10 illustrates circuitry for signal to actuator.
Figure 11:
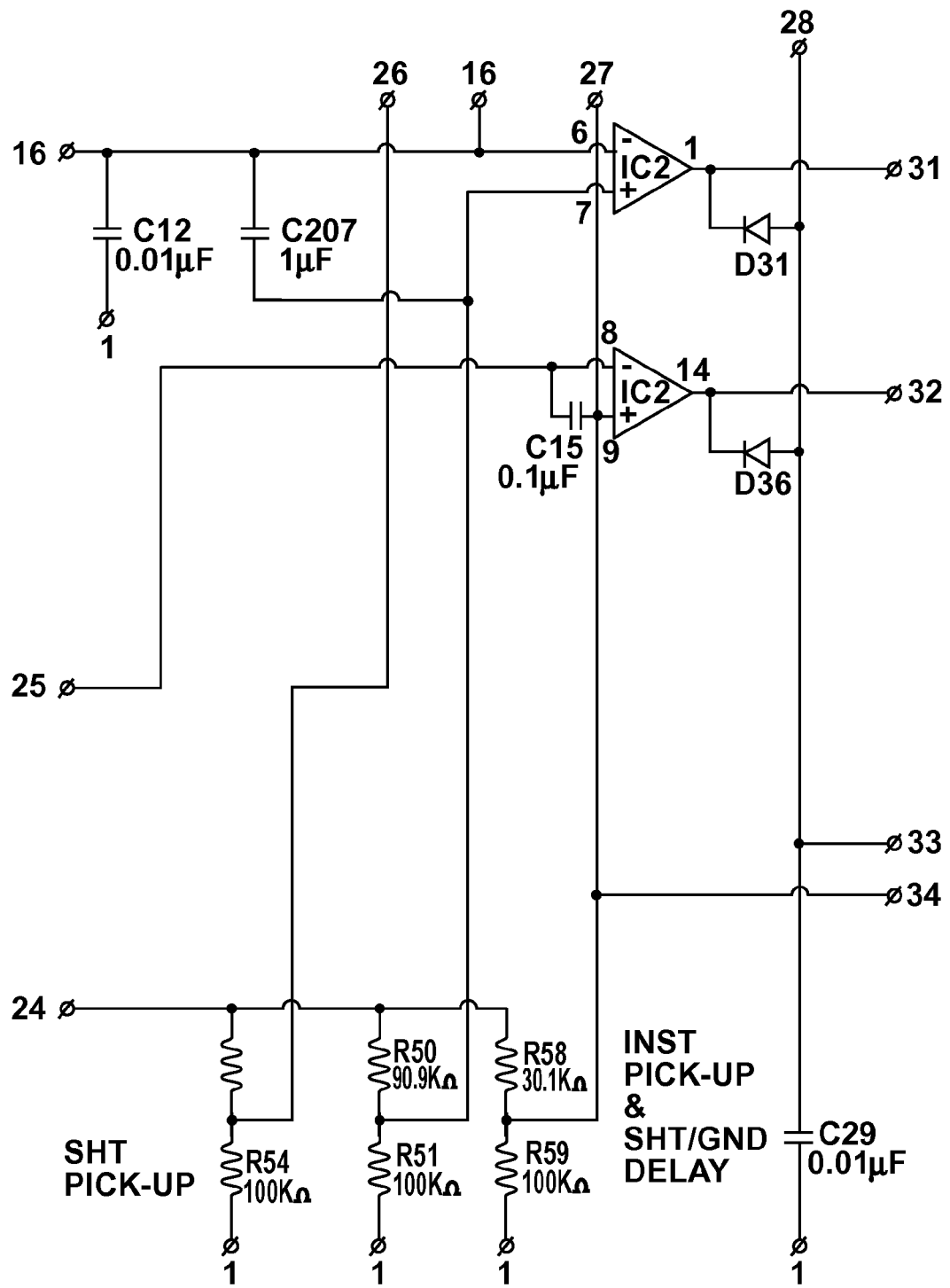
FIG. 11 illustrates circuitry for reference voltage for all functions.

According to another aspect of the present invention, the timing constant for portions of the circuitry of the programmable logic control device 2 is increased for the purposes of riding out relatively short duration high amplitude spikes, i.e. transients signals in the current. For example FIG. 8 illustrates comparator circuits where the timing characteristics of the $IC_{16}$ can be extended to capture most transients. For example if lightning strikes are followed by one millisecond transients the timing characteristics of the circuit can be set at 4 milliseconds. Other values greater or lesser than 4 milliseconds can be used so long as the time interval characteristics capture the duration of the transients. Transients are generally common, for example, as a result of a local lighting strike. Preferably, the time constant allows for at least 3 milliseconds delay, which is sufficiently long to capture most transients, further reducing the likelihood of nuisance tripping. If the time constraint is less than the duration of the transient, the circuit will trip.

Moreover the selected time duration may be initiated if the transient reaches a selected voltage level.

According to a yet other aspect of the present invention, the integrated circuits (IC's) implemented within the programmable logic control device 2 are housed or packaged in material that is resistant or substantially resilient to radiation. Generally speaking, radiation breaks down or degrades semiconductors in a circuit. Because of this, the integrated circuits are preferably packaged in ceramic material. Ceramic is dense and less susceptible to the effects of radiation than either plastic or glass. By changing the packaging to ceramic, IC's are better equipped to survive an irradiation process.

The control device in accordance with the present invention is preferably qualified as Class 1E Equipment according to the IEEE Std. 323-1974 Standard for Qualifying Class 1E Equipment for Nuclear Power Generating Stations.

Examples of appropriate IC's are the following generic models that are commonly available: LM139JB, LM193JGB and LM555JGB. For example, with reference to the figures, LM139JB can be implemented for $IC_1$, $IC_2$, $IC_3$, $IC_4$ and $IC_6$, LM193JGB can be implemented for $IC_7$, and LM555JGB can be implemented for $IC_5$).

The programmable logic control device 2 disclosed herein allow the user to quickly select the desired control parameter of instantaneous time, short time, long time and ground faults and to change such parameters by adjusting control knobs as well as the ampere-taps. The programmable logic control device described herein is therefore universal in the sense that one logic device can be used to effectively monitor electrical systems over a range of electrical characteristics by selecting the appropriate ampere tap and control knobs which are incorporated in the device 2 rather than utilizing a number of current transformers or logic devices. In the preferred embodiment disclosed herein the programmable logic control device may be universally utilized to monitor currents between a range of 30 to 4400 amps.

Moreover, if all of the control parameters are set then the trip device 4 will be activated to open circuit breaker 5 when primary current $I_1$ in conductor 6 reaches the value of the least severe parameter selected for instantaneous time, short time, long time or ground fault.

It will be appreciated by those skilled in the art that other variations of the preferred embodiment may also be practised without departing from the scope of the invention.

What is claimed is:

1. A programmable logic control device for monitoring a current and for signalling a circuit control device, the programmable logic control device including:
   (a) electrical power means for activating the circuit control device;
   (b) electrical circuitry means including integrated circuitry means for monitoring the current of the circuit, the electrical circuitry means including:
      (i) adjustable electrical signal input circuitry means to match the programmable logic control device to the current;
      (ii) adjustable pick-up circuitry means for adjusting a selected level of the current monitored in the circuit;
      (iii) adjustable time circuitry means for adjusting a time duration of the selected level of electrical current so as to command the electrical power means;
      (iv) control means for controlling voltage level applied to the adjustable pick-up circuitry means and time circuitry means; and
      (v) spaced first and second thermisters, and only a resistor disposed directly between said first and second thermister and connected directly in series thereto
   wherein the integrated circuitry means is packaged in a material that is resistant to nuclear radiation.

2. The programmable logic control device of claim 1 wherein the circuit resides in a nuclear reactor environment.

3. The programmable logic control device of claim 1 wherein the material is ceramic.

4. The programmable logic control device as claimed in claim 1 wherein the selected interval is sufficient in duration to minimize nuisance tripping.

5. The programmable logic control device as claimed in claim 1 wherein the selected interval is at least 3 milliseconds.

6. The programmable logic control device as claimed in claim 1 wherein the adjustable signal input circuitry means includes selectable ampere-taps.

7. The programmable logic control device as claimed in claim 1 wherein said programmable device is adjustable to monitor the current in the circuit between a range of approximately 30 amps and 4400 amps.

8. The programmable logic control device as claimed in claim 1 wherein the control means includes means to drop the voltage level to the adjustable pick-up circuitry means and the time circuitry means.

9. The programmable logic control device as claimed in claim 1 including ground fault circuitry means for activating the circuit control device in the event of a ground fault in the circuit.

10. A programmable logic control device for monitoring a current of a circuit in a nuclear reactor environment and for activating a circuit control device if the current exceeds a selected level for a selected interval, the programmable logic control device including:
    (a) electrical power means for activating the circuit control device;
    (b) electrical circuitry means including integrated circuitry means for monitoring the current of the circuit, the electrical circuitry means including:
       (i) adjustable electrical signal input circuitry means to match the programmable logic control device to the current;
       (ii) adjustable pick-up circuitry means for adjusting the selected level for the current of the circuit;
       (iii) adjustable time circuitry means for adjusting the selected interval for the selected level for the current so as to command the electrical power means, the selected interval sufficient in duration to minimize nuisance tripping; and (iv) control means for controlling voltage level applied to the adjustable pick-up circuitry means and time circuitry means substantially without resistive burden, and the control means including spaced first and second thermisters, and only a resistor disposed directly between said first and second thermister and connected directly in series thereto so as to stabilize the voltage level for temperature fluctuations; wherein the integrated circuitry means is housed in a material that is resistant to nuclear radiation.

11. The programmable logic control device of claim 10 wherein the material is ceramic.

12. The programmable logic control device of claim 11 wherein the selected interval is at least 3 milliseconds.

13. A programmable logic control device for monitoring a current of a circuit and for activating a circuit control device if the current exceeds a selected level for a selected interval, said programmable logic control device comprising:
(a) electrical power means for activating the circuit control device; and
(b) integrated circuitry means for monitoring the current of the circuit, the integrated circuitry means including:
(i) control means including a shunt comprising spaced first and second thermistors and only a resistor disposed directly between the first and second thermister and connected directly in series thereto that varies inversely to temperature fluctuations for stabilizing the voltage level for said temperature fluctuations.

14. The control device as claimed in claim 13 wherein the integrated circuitry means is housed in ceramic.

15. The control device as claimed in claim 13 wherein the selected interval is sufficient in duration to minimize nuisance tripping.

16. The control device as claimed in claim 15 wherein the selected interval is at least 3 milliseconds.

17. The control device as claimed in claim 13 wherein said programmable device is adjustable to monitor the current in the circuit between a range of approximately 30 amps and 4400 amps.

18. A programmable logic control device for monitoring a current of a circuit and for activating a circuit control device if the current exceeds a selected level for a selected interval, said control device comprising:
(a) electrical power means for activating the circuit control device; and
(b) electrical circuitry means for monitoring the current of the circuit, the electrical circuitry means comprising:
(i) control means including a spaced first and second thermister, and only a resistor disposed directly between said first and second thermister and connected directly in series thereto.

\* \* \* \* \*